United States Patent
Schillinger et al.

(10) Patent No.: US 12,447,610 B2
(45) Date of Patent: Oct. 21, 2025

(54) METHOD FOR CONTROLLING A ROBOTIC DEVICE

(71) Applicant: Robert Bosch GmbH, Stuttgart (DE)

(72) Inventors: Philipp Christian Schillinger, Renningen (DE); Akshay Dhonthi Ramesh Babu, Ingolstadt (DE); Leonel Rozo, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 264 days.

(21) Appl. No.: 18/161,142

(22) Filed: Jan. 30, 2023

(65) Prior Publication Data

US 2023/0241772 A1 Aug. 3, 2023

(30) Foreign Application Priority Data

Feb. 2, 2022 (DE) ...................... 10 2022 201 116.3

(51) Int. Cl.
  *B25J 9/00* (2006.01)
  *B25J 9/16* (2006.01)
  *B25J 13/08* (2006.01)

(52) U.S. Cl.
  CPC ............. *B25J 9/163* (2013.01); *B25J 9/1653* (2013.01); *B25J 9/1661* (2013.01); *B25J 13/08* (2013.01)

(58) Field of Classification Search
  CPC ........ B25J 9/163; B25J 9/1653; B25J 9/1661; B25J 13/08
  See application file for complete search history.

(56) References Cited

U.S. PATENT DOCUMENTS

| | | | |
|---|---|---|---|
| 2016/0246929 A1* | 8/2016 | Zenati | G10L 15/22 |
| 2020/0398427 A1* | 12/2020 | Kupcsik | B25J 9/163 |
| 2021/0125052 A1 | 4/2021 | Tremblay et al. | |
| 2021/0334696 A1* | 10/2021 | Traut | G06N 3/006 |

(Continued)

FOREIGN PATENT DOCUMENTS

| | | |
|---|---|---|
| DE | 102019001207 A1 | 8/2019 |
| DE | 102019203634 A1 | 9/2020 |
| DE | 102019207410 A1 | 11/2020 |

(Continued)

OTHER PUBLICATIONS

Rozo et al., "Learning and Sequencing of Object-Centric Manipulation Skills for Industrial Tasks," 2020 IEEE/RSJ International Conference on Intelligent Robots and Systems (IROS), 2020, pp. 9072-9079.

(Continued)

*Primary Examiner* — Truc M Do
(74) *Attorney, Agent, or Firm* — NORTON ROSE FULBRIGHT US LLP

(57) ABSTRACT

A method of controlling a robotic device. The method includes generating a robot control model for performing a task, wherein the robot control model comprises parameters which influence the performance of the task, adjusting the parameters of the robot control model by optimizing a target function which evaluates the adherence to at least one condition with respect to the temporal progression of at least one continuous sensor signal when performing the task, and controlling the robotic device according to the robot control model in order to perform the task using the adjusted parameters.

6 Claims, 3 Drawing Sheets

(56) References Cited

U.S. PATENT DOCUMENTS

2022/0299949 A1* 9/2022 Oyama ................ G05B 13/024

FOREIGN PATENT DOCUMENTS

| | | |
|---|---|---|
| DE | 102019216229 A1 | 4/2021 |
| DE | 102020206916 A1 | 12/2021 |
| DE | 102020207085 A1 | 12/2021 |
| DE | 102020209685 A1 | 2/2022 |
| EP | 3587045 A1 | 1/2020 |
| EP | 3753684 A1 | 12/2020 |

OTHER PUBLICATIONS

Innes et al., "Elaborating on Learned Demonstrations With Temporal Logic Specifications," Cornell University, 2020, pp. 1-10.
Dhonthi et al., "Study of Signal Temporal Logic Robustness Metrics for Robotic Tasks Optimization", Cornell University, 2021, pp. 1-3.

* cited by examiner

METHOD FOR CONTROLLING A ROBOTIC DEVICE

CROSS REFERENCE

The present application claims the benefit under 35 U.S.C. § 119 of German Patent Application No. DE 10 2022 201 116.3 filed on Feb. 2, 2022, which is expressly incorporated herein by reference in its entirety.

FIELD

The present disclosure relates to methods used for controlling a robotic device.

BACKGROUND INFORMATION

Given a task for a robot to perform manipulation (of an object), it is a core problem to determine a suitable trajectory (e.g., for a robotic arm) for the particular task. Several different approaches exist, all of which have different characteristics, in order to accomplish certain types of tasks as efficiently as possible. One example is learning from demonstrations (LfD).

In LfD, a human user ("expert") demonstrates to the robot the intended behavior, i.e., exemplary trajectories, that are intended to accomplish a particular task. Based on these demonstrations, the robot learns a robot control model and then acquires a corresponding movement skill. See, e.g., Rozo, L., Guo, M., Kupcsik, A. G., Todescato, M., Schillinger, P., Giftthaler, M., . . . & Bueger, M. "Learning and sequencing of object-centric manipulation skills for industrial tasks" in 2020 IEEE/RSJ International Conference on Intelligent Robots and Systems (IROS) (pp. 9072-9079) IEEE, hereinafter referred to as reference [1], for further details on robot-based assembly based on demonstrated skills.

The LfD approach is particularly suitable when the criteria for the desired trajectories are difficult to describe explicitly. However, this approach is only capable of capturing implicit criteria, and there is no general mechanism for adding further explicit limitations or desired characteristics.

To address this limitation, such explicit conditions can be expressed in a separate formalism, and then optimization techniques can be employed to improve the movement skill originally learned. For example, in Innes, C., & Ramamoorthy, S., "Elaborating on learned demonstrations with temporal logic specifications", 2020, arXiv preprint arXiv:2002.00784, hereinafter referred to as reference [2], objectives in linear temporal logic (LTL), which is a variant of temporal logic, are formulated in order to optimize dynamic movement primitives (DMP), which is a dynamic systemic variant of LfD.

The paper by Dhonthi, A., Schillinger, P., Rozo, L., & Nardi, D. (2021) "Study of Signal Temporal Logic Robustness Metrics for Robotic Tasks Optimization", arXiv preprint arXiv:2110.00339.", hereinafter referred to as reference [3], also describes the formulation of conditions by STL (Signal Temporal Logic).

The approach used in reference [2] requires the determination of gradients, and for this reason the range of explicit conditions that can be defined is limited.

It is therefore desirable to adopt approaches that allow explicit conditions to be defined within a larger range.

SUMMARY

According to various example embodiments of the present invention, there is provided a method for controlling a robotic device, said method comprising generating a robot control model for performing a task, wherein the robot control model comprises parameters which influence the performance of the task, adjusting the parameters of the robot control model by optimizing a target function which evaluates the adherence to at least one condition with respect to the temporal progression of at least one continuous sensor signal when performing the task, and controlling the robotic device according to the robot control model in order to perform the task using the adjusted parameters.

The optimization of the target function is performed by, e.g., black box optimization. The use of black box optimization (BBO) eliminates the need for gradients, as are required for example in the approach of reference [2], and thus enables the definition of the conditions (e.g., by means of signal temporal logic (STL)) over a much wider and more meaningful range of signals, e.g., the indication of constraints for resulting forces or generally the effects of a trajectory rather than the trajectory itself. Consequently, the method described above is able to cover a wider range of applications.

Regarding BBO, the task can be performed for different scenarios, or for each evaluation of the target function, the same scenario may be used (meaning, e.g., that the object is always in the same place). It can be advantageous to keep the scenario as similar as is practically possible in order to minimize unknown influences. It can likewise be advantageous, when practicable, to perform a number of different scenarios for each parameter set and to form a mean value across the executions. For practical considerations, it may not be possible to repeat a scenario exactly, yet this is also no criterion for excluding BBO, but may yield poorer results or a slower optimization.

For example, the robot control method described above can be used for robot manipulation tasks in which an expert indicates and specifies the desired behavior of the robot. This is especially the case in robot-based assembly, in which certain assembly steps require complicated movements while at the same time additional conditions must be satisfied. As an example, during an assembly operation a pin must be inserted into another workpiece in a particular way. A human being can demonstrate the movement as it could be difficult to completely describe it in formal terms, but it is nevertheless desirable that certain limitations be achieved, e.g., reducing contact forces or target position accuracy, which might not able to be demonstrated in an optimal manner.

Various embodiment examples of the present invention are specified hereinafter.

Embodiment example 1 is a method used for controlling a robotic device, as described above.

Embodiment example 2 is a method according to embodiment example 1, further comprising representing the at least one condition according to temporal signal logic in at least one signal temporal logic formula, converting the at least one signal temporal logic formula into at least one robustness measure, and evaluating the target function by determining a value of the at least one robustness measure for performing the task.

The use of signal temporal logic (STL) to capture conditions enables meaningful specifications of conditions, e.g., by being able to specify time intervals for temporal operators. In other words, the at least one condition is represented by one or more time intervals and one or more continuous signals. Efficient approaches exist for converting STL formulas into real-valued reward functions (referred to as robustness measures) which, due to their mathematical properties, enable efficient and meaningful optimization of a robot control model.

Embodiment example 3 is a method according to embodiment example 1 or 2, wherein the parameters of the robot control model comprise time-related parameters and location-related parameters.

A robot control model having such parameters, e.g., an HSMM with probabilities of duration as time-related parameters and (for example) the middle layers as location-related parameters corresponds very well to the use of STL for the specification of conditions because STL formulates temporal and spatial conditions.

Embodiment example 4 is a method according to one of embodiment examples 1 through 3, wherein the robot control model comprises a hidden semi-Markov model (HSMM).

The use of an HSMM model (e.g., for LfD) results in a discrete state based model for the learned skill (i.e., the skill used to perform the task), in which each state approximately corresponds to a probabilistic waypoint along the trajectory, and the transition durations define the rate of execution of the respective sections of the trajectory. This provides a meaningful basis for the specification of STL conditions by establishing a natural link between the STL target and the parameters of the capability model.

Embodiment example 5 is a method according to one of embodiment examples 1-4, wherein the at least one continuous sensor signal indicates a location of a portion of the robotic device and/or a force acting on a portion of the robotic device.

In particular, conditions can thus be specified so that the robotic device remains within (or outside) certain ranges (e.g., with an end-effector) and does not exceed allowable forces (which it, e.g., applies to a manipulated object).

Embodiment example 6 is a robot control device configured to perform a method according to one of embodiment examples 1 to 5.

Embodiment example 7 is a computer program comprising instructions which, when executed by a processor, prompt the processor to perform a method according to one of embodiment examples 1 to 5.

Embodiment example 8 is a computer-readable medium storing instructions which, when executed by a processor, prompt the processor to perform a method according to one of embodiment examples 1 to 5.

In the figures, like reference numbers generally refer to the same parts throughout the various views. The figures are not necessarily to scale, emphasis being instead generally placed on representing the principles of the present invention. In the following description, various aspects are described with reference to the figures.

DETAILED DESCRIPTION OF EXAMPLE EMBODIMENTS

The following detailed description relates to the figures, which show, for clarification, specific details and aspects of this disclosure by way of which the present invention can be implemented. Other aspects can be used, and structural, logical, and electrical changes can be made without departing from the scope of protection of the present invention. The various aspects of this disclosure are not necessarily mutually exclusive since some aspects of this disclosure can be combined with one or more other aspects of this disclosure in order to form new aspects.

Various examples are described in more detail below.

Figure 1:
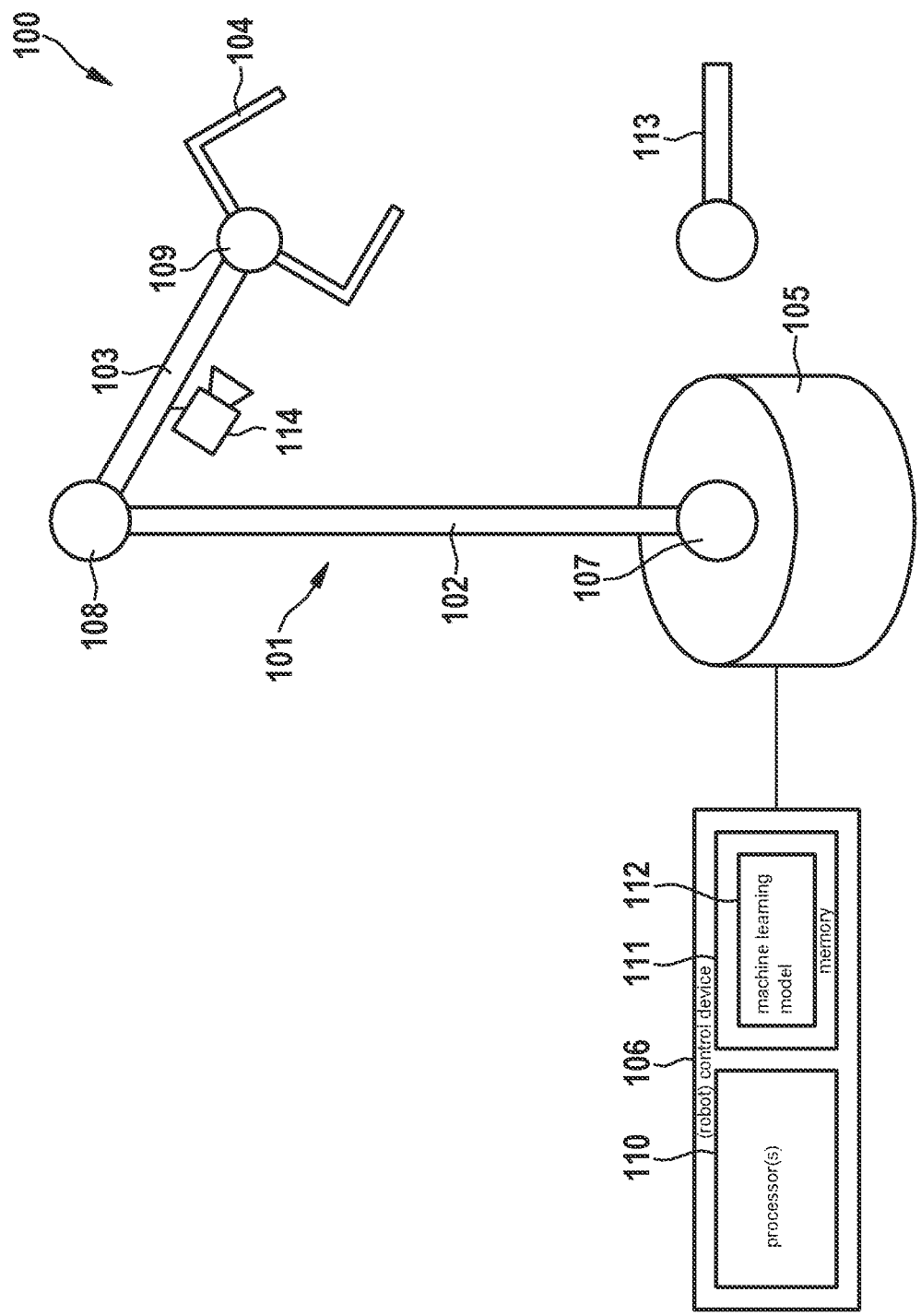
FIG. 1 shows a robot, according to an example embodiment of the present invention.

FIG. 1 shows a robot 100.

The robot 100 comprises a robotic arm 101, e.g., an industrial robotic arm used for handling or assembling a workpiece (or one or more other objects). The robotic arm 101 comprises manipulators 102, 103, 104 and a base (or support) 105, by means of which the manipulators 102, 103, 104 are supported. The term "manipulator" refers to the movable elements of the robotic arm 101, the actuation of which enables physical interaction with the environment, e.g., in order to perform a task. For the purpose of control, the robot 100 comprises a (robot) control device 106 configured to implement the interaction with the environment according to a control program. The last element 104 (farthest from the support 105) of the manipulators 102, 103, 104 is also referred to as the end effector 104 and can comprise one or more tools, e.g., a welding torch, a gripping instrument, a paint tool, or the like.

The other manipulators 102, 103 (which are closer to the base 105) can form a positioning device so that, together with the end effector 104, the robotic arm 101 is provided with the end effector 104 at its end. The robotic arm 101 is a mechanical arm that can provide functions similar to those of a human arm (possibly with a tool at its end).

The robotic arm 101 can comprise joint elements 107, 108, 109 connecting the manipulators 102, 103, 104 to one another and to the base 105. A joint element 107, 108, 109 can comprise one or more joints that may each provide rotary movement (i.e., rotational movement) and/or translational movement (i.e., displacement) for associated manipulators relative to one another. The movement of the manipulators 102, 103, 104 can be initiated by means of actuators controlled by the control device 106.

The term "actuator" can be understood to mean a component that is designed to influence a mechanism or process in response to the component being driven. The actuator can convert instructions output by the control device 106 (referred to as "activation") into mechanical movements. The actuator, e.g. an electromechanical converter, can be designed to convert, in response to its activation, electrical energy into mechanical energy.

The term "control device" can be understood to mean any type of logic implemented by an entity including, e.g., a circuit and/or a processor capable of executing software that is stored in a storage medium, firmware, or a combination of both, and which can issue instructions, e.g., to an actuator in the present example. For example, the control device can be configured by means of a program code (e.g., software) in order to control the operation of a robot.

In the present example, the control device 106 comprises one or more processors 110 and a memory 111 that stores code and data, based on which the processor 110 controls the robotic arm 101. According to various embodiments, the control device 106 controls the robotic arm 101 on the basis of a machine learning model 112 stored in the memory 111. For example, the robot 100 is to pick up an object 113. For example, the end effector 104 is a gripper and is to pick up the object 113, but the end effector 104 can also be configured for example to apply suction to the object 113 in order to pick it up.

According to various embodiments of the present invention, learning from demonstrations (LfD) is used to teach the robot 100 to perform a task. Human demonstrations can be encoded by the machine learning model 112 (in this case, a probabilistic or statistical model) representing the nominal plan of the task for the robot. The control device 106 can subsequently use the statistical model 112, which is also referred to as a robot trajectory model, to generate desired robotic movements.

The basic idea of LfD is to adapt a prescribed movement skill model, e.g. GMM, to a set of demonstrations. M demonstrations are to be provided, each containing $T_m$ data points for a data set of $N=\Sigma_m T_m$ overall observations $\xi=\{\xi_t\}_{t=1}^N$, where $\xi_t \in \mathbb{R}^d$. It is also assumed that the same demonstrations are recorded from the perspective of P different coordinate systems (given by the task parameters, e.g., local coordinate systems or frames of reference of objects of interest). One conventional way of obtaining such data consists of transforming the demonstrations from a static global frame of reference to a frame of reference p by $\xi_t^{(p)}=A^{(p)^{-1}}(\xi_t-b^{(p)})$. In this case, $\{(b^{(p)}, A^{(p)})\}_{p=1}^P$ is the translation and rotation of the (local) frame of reference p relative to a global coordinate system (i.e., the global frame of reference). A TP-GMM is then described by the model parameters $\{\pi_k, \{\mu_k^{(p)}, \Sigma_k^{(p)}\}_{p=1}^P\}_{k=1}^K$ where K represents the number of Gaussian components in the mixture model, $\pi_k$ is the previous probability of each component, and $\{\mu_k^{(p)}, \Sigma_k^{(p)}\}_{p=1}^P$ are the parameters of the k-th Gaussian component within the reference frame p.

In contrast to standard GMM, the mixture model above cannot be independently learned for each frame of reference. In fact, the mixing coefficients $\pi_k$ are shared by all reference frames, and the k-th component in reference frame p must map onto the corresponding k-th component in the global reference frame. Expectation maximization (EM) is an established method for learning such models.

Once learned, the TP-GMM can be used during execution to reproduce a trajectory for the learned movement skill. This includes controlling the robot so that starting from an initial configuration it reaches a target configuration (e.g., its end effector 104 moves from an initial pose to an end pose). To this end, the (time dependent) acceleration of the joint elements 107, 108, 109 is calculated. In view of the observed frames of reference $\{b^{(p)}, A^{(p)}\}_{p=1}^P$, the learned TP-GMM is converted into a single GMM with parameters $\{\pi_k, (\hat{\mu}_k, \hat{\Sigma}_k)\}_{k=1}^K$ by multiplying the affinely transformed Gaussian components across various frames of reference as follows $$\hat{\Sigma}_k = [\Sigma_{p=1}^P (\hat{\Sigma}_k^{(p)})^{-1}]^{-1}, \hat{\mu}_k = \hat{\Sigma}_k [\Sigma_{p=1}^P (\hat{\Sigma}_k^{(p)})^{-1} \hat{\mu}_k^{(p)}], \quad (1)$$

where the parameters of the updated Gaussian bell curve at each reference frame p are calculated as $\hat{\mu}_k^{(p)} = A^{(p)} \mu_k^{(p)} + b^{(p)}$ and $\hat{\Sigma}_k^{(p)} = A^{(p)} \Sigma_k^{(p)} A^{(p)^T}$. Although the task parameters may vary over time, the time index is omitted because of the notation.

Hidden semi-Markov models (HSMMs) extend hidden standard Markov Models (HMMs) by embedding time information of the underlying stochastic process. In other words, whereas in HMM the underlying hidden process is assumed to be Markov, i.e., the probability of transition to the next state only depends on the current state, in HSMM the state process is assumed to be semi-Markov. This means that a transition to the next state depends on the current state as well as on the elapsed time since the state was entered. These models can be used in combination with TP-GMMs for robotic movement skill coding to learn spatial-temporal characteristics of the demonstrations. A task-parameterized HSMM (TP-HSMM) model is defined as:

$$\Theta = \{\{a_{hk}\}_{h=1}^K, (\mu_k^D, \sigma_k^D), \pi_k, \{(\mu_k^{(p)}, \Sigma_k^{(p)})\}_{p=1}^P\}_{k=1}^K,$$

where $a_{hk}$ is the transition probability from state h to k; $(\mu_k^D, \sigma_k^D)$ describes the Gaussian distributions for the duration of state k, i.e., the probability that state k will persist for a certain number of consecutive steps; and $\{\pi_k, \{\mu_k^{(p)}, \Sigma_k^{(p)}\}_{p=1}^P\}_{k=1}^K$ is equal to the previously introduced TP-GMM, which represents the probability of observation that corresponds to state k. In this context, it should be noted that the number of states represents the number of Gaussian components in the "connected" TP-GMM.

In view of a particular (partial) sequence of observed data points $\{\xi_l\}_{l=1}^t$, it shall be assumed that the associated sequence of states in $\Theta$ is given by $s_t = s_1 s_2 \ldots s_t$. The probability that the data point $\xi_t$ belongs to state k (i.e., $s_t = k$) is given by the forward variable: $\alpha_t(k) = p(s_t = k, \{\xi_l\}_{l=1}^t)$:

$$\alpha_t(k) = \Sigma_{\tau=1}^{t-1} \Sigma_{h=1}^K \alpha_{t-\tau}(h) a_{hk} \mathcal{N}(\tau|\mu_k^D, \sigma_k^D) o_\tau^t, \quad (2)$$

where $o_\tau^t = \Pi_{l=t-\tau+1}^t \mathcal{N}(\xi_l | \hat{\mu}_k, \hat{\Sigma}_k)$ is the emission probability, and $(\hat{\mu}_k, \hat{\Sigma}_k)$ is derived from (1) in view of the task parameters. Further, the same forward variable can also be used during reproduction in order to predict future steps until $T_m$.

However, since future observations are not available in this case, only transition and duration information will be used, i.e., by setting $\mathcal{N}(\xi_l | \hat{\mu}_k, \hat{\Sigma}_k) = 1$ for all k and $\ell > t$ in (2). Finally, the sequence of most likely states $s^*_{T_m} = s^*_1 s^*_2 \ldots s^*_{T_m}$ is determined by choosing $s^*_t = \text{argmax}_k \alpha_t(k)$, $\forall 1 \leq t \leq T_m$.

A desired end observation of the robotic state is now to be given as $\xi_T$, where T is the movement skill time horizon (e.g., the average length across the demonstrations). Moreover, the initial robotic state is observed as $\xi_1$. Regarding the execution of the movement skill (i.e., movement skill reproduction) in view of the learned model $\Theta_a$, only the most likely state sequence $s^*_T$ is constructed in view of only $\xi_1$ and $\xi_T$.

Reproduction using the forward variable cannot be done directly in this case, as the forward variable in equation (2) calculates the sequence of marginally most likely states, whereas what is desired is the collectively most likely sequence of states in consideration of $\xi_1$ and $\xi_T$. Consequently, when (2) is used, there is no guarantee that the returned sequence $s^*_T$ will correspond to both the spatial-temporal patterns of the demonstrations and the final observation. With respect to an example of picking up an object, it may return a most likely sequence corresponding to "picking up from the side" even if the desired end configuration is that the end effector is located on the top side of the object.

According to one embodiment, a modification of the Viterbi algorithm is used to solve this problem. The classical Viterbi algorithm can be used to find the most likely sequence of states (also called the Viterbi path) in HMMs that result in a given flow of observed events. According to one embodiment, a method is used that differs from the one described in two main aspects: (a) it works with HSMM instead of HMM; and, more significantly, (b) most observations are absent, apart from the first and the last. In particular, given the absence of observations, the Viterbi algorithm is $$\delta_t(j) = \max_{d \in \mathcal{D}} \max_{i \neq j} \delta_{t-d}(i) a_{ij} p_j(d) \prod_{t'=t-d+1}^t \tilde{b}_j(\xi_{t'}), \quad (3)$$

$$\delta_1(j) = b_j(\xi_1) \pi_j p_j(1),$$

where $p_j(d) = \mathcal{N}(d|\mu_j^D, \sigma_j^D)$ is the probable duration of the state j actual, $\delta_t(j)$ is the probability that the system is in state j at time t, and not in state j at t+1; and $$\tilde{b}_j(\xi_{t'}) = \begin{cases} \mathcal{N}(\xi_{t'}|\hat{\mu}_j, \hat{\Sigma}_j), & t = 1 \vee t = T; \\ 1, & 1 < t < T. \end{cases}$$

where $(\hat{\mu}_j, \hat{\Sigma}_j)$ is the global Gaussian component j in $\Theta_a$ of (1) in view of $\xi_{t'}$. Specifically, at any time t and for any state j, the two arguments that maximize the equation $\delta_t(j)$ are recorded, and a simple backtracking procedure is used to find the most likely state sequence $s^*_T$. In other words, the above algorithm derives the most likely sequence $s^*_T$ for the movement skill a that yields the final observation $\xi_T$ based on $\xi_1$.

Regarding a (movement) skill of a robot 100, it may now be desirable in certain applications for certain conditions to be definable that are met by the robot 100 when executing the skill. Examples in this regard are that a particular force or friction is not exceeded (e.g., two parts are not pushed too hard together, or a sleeve is not pushed over a rod with too much friction), or a particular spatial area is not departed from.

According to various embodiments, an approach is provided for considering formal specifications within skills (or capabilities) learned by LfD. Specifically, according to various embodiments, signal temporal logic (STL), which is a more expressive variant of temporal logic as compared to LTL, is used to formulate task specifications in the form of reward functions, and a black box optimization (BBO) approach is employed to adjust a skill learned by LfD as the hidden semi-Markov model (HSMM).

Accordingly, various embodiments are based on STL, BBO, and learning of robotic skills by way of LfD as HSMM. Regarding conversion of an STL specification to a targeting function for BBO, see reference [3] for a description of various robustness measures that can be used in connection with the embodiments described below. Bayesian optimization (BO) or CMA-ES (Covariance Matrix Adaptation Evolution Strategy) can be used for BBO. The embodiments described below do not make any specific assumptions regarding the BB optimization technique to be used.

According to various embodiments, an optimization method improves a robot control model for a particular skill so that given conditions are accounted for. This takes place by way of an iterative process, in which the following operations (1-4; see below) are repeated for a given number of times in order to obtain an improved version of the robot control model with respect to the specification of a target that reflects the given conditions.

Based on an initial robotic control model used for a skill, according to various embodiments of an HSMM, e.g., derived from a set of human demonstrations (e.g., reference trajectories), and a formal STL specification of conditions (e.g., targets to be achieved when performing a task as auxiliary conditions), the following steps are performed repeatedly (e.g., by control device 106):

1) determining a modification (variant) of the robotic model for the skill
2) performing the skill by modifying the robotic model and recording (sensor) signals occurring in the process
3) assessing the extent to which the recorded signals comply with (i.e. satisfy) the predetermined STL specification for the conditions
4) updating the BBO optimizer and remembering the currently best modification (with respect to satisfaction of the conditions)

Figure 2:
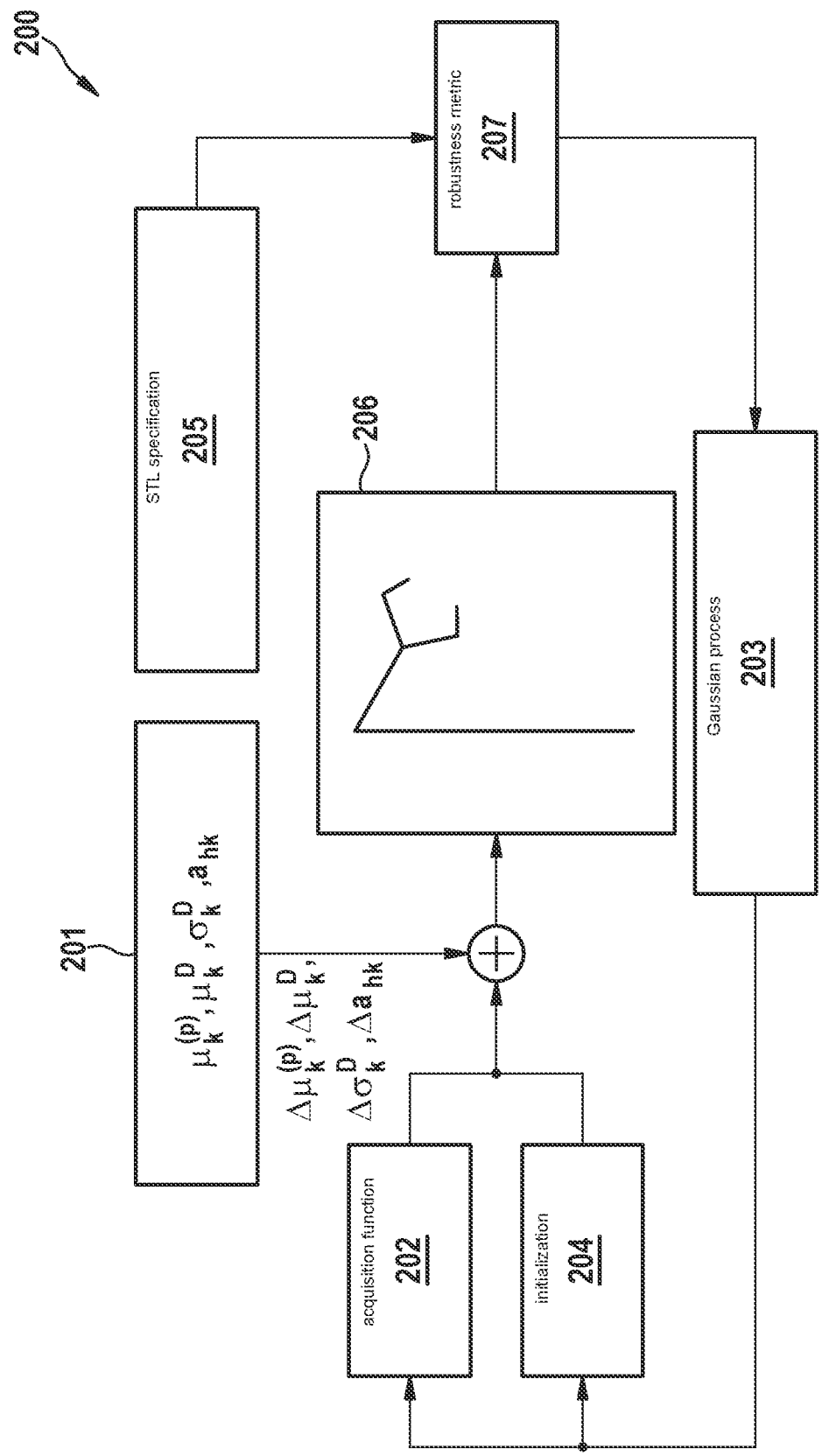
FIG. 2 shows a flow chart illustrating the adjustment of a robot control model to given conditions according to the four operations specified above, according to an example embodiment of the present invention.

FIG. 2 shows a flow chart 200 illustrating the adaptation of a robot control model to given conditions according to the four operations mentioned above.

Regarding operation 1), a robot control model for a skill can be altered in a variety of ways, i.e., by modifying a number of different parameters 201 of the robot control model. Given the representation of an HSMM model, the natural choice for such parameters 201 are the middle layers ($\mu_k^{(p)}$) of the components, the probability distribution parameters for the duration of the components $\mu_k^D, \sigma_k^D$ and the transition probabilities $a_{hk}$ between the components. These are modified for each modification by interferences (changes) $\Delta\mu_k^{(p)}, \Delta\mu_k^D, \Delta\sigma_k^D, \Delta a_{hk}$ in order to modify the robot control model.

In addition, regarding operation 1), the determination of the parameters for the modification may be performed in various ways and will depend primarily on the choice of the BBO method. For example, the parameter values can be randomly selected. In Bayesian optimization (BO), the parameter values are typically determined (starting from an initialization 204 of the optimization parameters) by optimizing a so-called acquisition function 202, wherein a replacement (e.g., a Gaussian process 203) of the (unknown) function to be optimized is formed in order to model the relationship between the selection of the parameters and the expected target value. When using CMA-ES, the parameter values are taken from a probability distribution that is modified over time in order to sample parameters that result in a higher target function with a higher level of probability.

Following modification of the robot control model, execution 206 of the skill is performed according to the modified robot control model.

Regarding operation 2), the given STL specification 205 is expressed by a series of so-called predicates that require certain characteristics regarding the execution of the skill, e.g., maintaining a small magnitude of the contact forces or remaining outside or within certain areas of the work space. This indicates directly which sensor signals must be recorded during the execution of the task, i.e., which variables must be measured (namely, e.g., a respective contact force or the position, e.g., of the end effector 104 of the robot).

In operation 3), the signals recorded during the execution 206 are discretized, and the value of a robustness metric 207 of STL specification 205 can be calculated for these signals (e.g., as described in reference [3]). Various formulations of robustness metrics exist comprising a variety of characteristics which are suitable for the purpose of task optimization. One descriptive metric is referred to as spatial robustness, which measures the distances of the signal values for changing the truth values of the propositions for each individual point in time along the discretized signal. For example, this metric measures the difference between measured forces and the specified contact force, or it measures the Euclidean distance to a particular area in the work space.

Regarding operation 4), both the changes of the model parameters 201 and the resulting value 207 of the STL-specified target are now known and can be transferred to the BBO method being used. This operation will also depend on the BBO method being used. For example, in the case of BO, the Gaussian process (GP) 203 is updated so as to include the observation obtained or, in the case of CMA-ES, the sample distribution is updated accordingly. In extreme cases, e.g., in a random sample of parameters, this step can be omitted.

Figure 3:
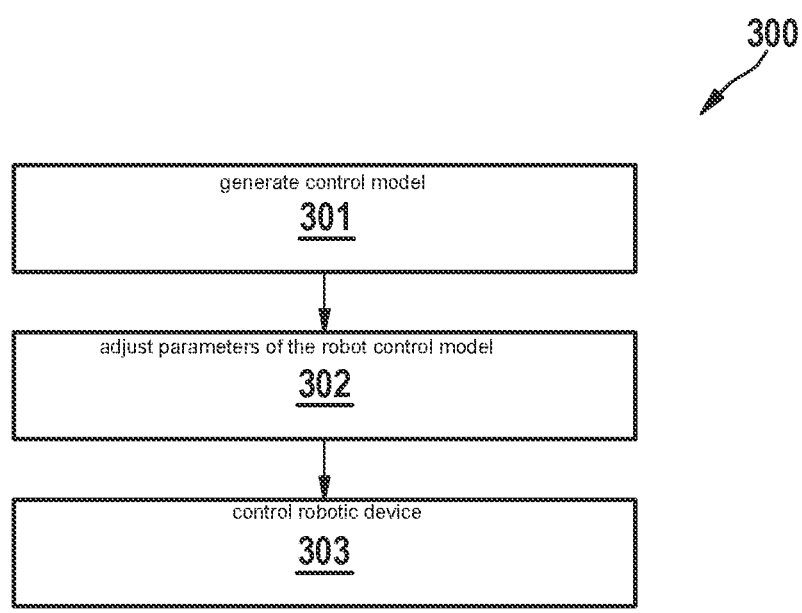
FIG. 3 shows a flow chart depicting a method for controlling a robotic device, according to an example embodiment of the present invention.

In summary, a method is provided according to various embodiments, as shown in FIG. 3.

FIG. 3 shows a flow chart 300 depicting a method used for controlling a robotic device.

At 301, a robot control model for performing a task is generated, wherein the robot control model comprises parameters that influence the performance of the task.

At 302, the parameters of the robot control model are adjusted by optimizing a target function which evaluates the adherence to at least one condition with respect to the temporal progression of at least one continuous sensor signal when performing the task.

At 303, the robotic device is controlled according to the robot control model in order to perform the task using the adjusted parameters.

The method shown in FIG. 3 can be performed by one or more computers having one or more data processing units. The term "data processing unit" can be understood to mean any type of entity that enables the processing of data or signals. For example, the data or signals can be processed according to at least one (i.e., one or more than one) specific function performed by the data processing unit. A data processing unit can comprise or be formed from an analog circuit, a digital circuit, a logic circuit, a microprocessor, a microcontroller, a central processing unit (CPU), a graphics processing unit (GPU), a digital signal processor (DSP), an integrated circuit of a field-programmable gate array (FPGA), or any combination thereof. Any other way of implementing the respective functions described in greater detail herein can also be understood as a data processing unit or logic circuitry. One or more of the method steps described in detail herein can be performed (e.g., implemented) by a data processing unit by one or more specific functions executed by the data processing unit.

The approach shown in FIG. 3 can be used to generate a control signal for a robotic device. The term "robotic device" can be understood to mean any technical system (having a mechanical part whose movement is controlled), e.g., a computer-controlled machine, a vehicle, a household appliance, an electric tool, a manufacturing machine, a personal assistant, or an access control system. A control rule for the technical system is learned, and the technical system is then controlled accordingly.

To generate the control signal, (sensor) data obtained from one or more received sensor signals are processed, e.g., in the form of scalar time series containing specific data about any type of trajectories, e.g., robot end effector poses (position and orientation), forces, robotic joint forces, etc.

The sensor data are processed, which may include classifying the sensor data or performing semantic segmentation on the sensor data in order to detect the presence of objects (in the environment in which the sensor data were obtained) with respect to the adherence (and quantification of the adherence) to a user-provided formal specification of one or more conditions.

Embodiments can be used in the context of training a machine learning system and controlling a robot, e.g., autonomously by robot manipulators, in order to accomplish various manipulation tasks under various scenarios. In particular, embodiments may be applied to the control and monitoring of the execution of manipulation tasks, e.g., in assembly lines. For example, they can be seamlessly integrated into a conventional GUI for a control process (e.g., in order to allow a user to specify conditions).

Although specific embodiments have been illustrated and described herein, one skilled in the art will recognize that the specific embodiments shown and described can be substituted by a variety of alternative and/or equivalent implementations without departing from the scope of protection of the present invention. This application is to cover any adaptations or variations of the specific embodiments discussed herein.

What is claimed is:

1. A method for controlling a robotic device, the method comprising the following steps:
generating a robot control model for performing a task, wherein the robot control model includes parameters which influence the performance of the task;
adjusting the parameters of the robot control model by optimizing a target function which evaluates the adherence to at least one condition with respect to a temporal progression of at least one continuous sensor signal when performing the task;
representing the at least one condition according to temporal signal logic in at least one temporal signal logic formula;
converting the at least one temporal signal logic formula into at least one measure of robustness;
evaluating the target function by determining a value of the at least one measure of robustness for performing the task; and
controlling the robotic device according to the robot control model to perform the task using the adjusted parameters.

2. The method according to claim 1, wherein the parameters of the robot control model include time-related parameters and location-related parameters.

3. The method according to claim 1, wherein the robot control model is a hidden semi-Markov model (HSMM).

4. The method according to claim 1, wherein the at least one continuous sensor signal indicates a location of a portion of the robotic device and/or a force acting on a portion of the robotic device.

5. A robot control device configured to control a robotic device, the robotic device configured to:
generate a robot control model for performing a task, wherein the robot control model includes parameters which influence the performance of the task;
adjust the parameters of the robot control model by optimizing a target function which evaluates the adherence to at least one condition with respect to a temporal progression of at least one continuous sensor signal when performing the task;
represent the at least one condition according to temporal signal logic in at least one temporal signal logic formula;
convert the at least one temporal signal logic formula into at least one measure of robustness;
evaluate the target function by determining a value of the at least one measure of robustness for performing the task; and
control the robotic device according to the robot control model to perform the task using the adjusted parameters.

6. A non-transitory computer-readable medium on which is stored a computer program for controlling a robotic device, the computer program, when executed by a processor, causing the processor to perform the following steps:
generating a robot control model for performing a task, wherein the robot control model includes parameters which influence the performance of the task;

adjusting the parameters of the robot control model by optimizing a target function which evaluates the adherence to at least one condition with respect to a temporal progression of at least one continuous sensor signal when performing the task;

representing the at least one condition according to temporal signal logic in at least one temporal signal logic formula;

converting the at least one temporal signal logic formula into at least one measure of robustness;

evaluating the target function by determining a value of the at least one measure of robustness for performing the task; and controlling the robotic device according to the robot control model to perform the task using the adjusted parameters.

* * * * *